United States Patent
Billiet

(10) Patent No.: US 8,465,571 B2
(45) Date of Patent: Jun. 18, 2013

(54) FLUID TREATMENT DEVICE

(75) Inventor: Colin Thomas Billiet, Gateshead (GB)

(73) Assignee: Nano-Porous Solutions Limited, Gateshead Tyne and Wear (GB)

( * ) Notice: Subject to any disclaimer, the term of this patent is extended or adjusted under 35 U.S.C. 154(b) by 428 days.

(21) Appl. No.: 12/739,865

(22) PCT Filed: Oct. 27, 2008

(86) PCT No.: PCT/GB2008/051003
§ 371 (c)(1),
(2), (4) Date: Apr. 26, 2010

(87) PCT Pub. No.: WO2009/053760
PCT Pub. Date: Apr. 30, 2009

(65) Prior Publication Data
US 2010/0251891 A1    Oct. 7, 2010

(30) Foreign Application Priority Data
Oct. 27, 2007    (GB) .................................. 0721107.1

(51) Int. Cl.
*B01D 53/02*    (2006.01)
(52) U.S. Cl.
USPC .......... 95/95; 95/96; 95/102; 95/148; 55/476; 34/80
(58) Field of Classification Search
USPC .......... 95/96, 95, 97, 102, 148; 55/476; 34/80
See application file for complete search history.

(56) References Cited

U.S. PATENT DOCUMENTS

| 2,379,321 A | 6/1945 | Sutcliffe et al. |
| 4,919,695 A | 4/1990 | Trepaud |
| 5,108,464 A | 4/1992 | Friesen et al. |
| 6,126,724 A * | 10/2000 | Martin et al. .................. 96/4 |
| 2003/0205130 A1 | 11/2003 | Neu et al. |

FOREIGN PATENT DOCUMENTS

| GB | 397 128 A | 8/1933 |
| JP | 08 084907 | 4/1996 |

OTHER PUBLICATIONS

The International Search Report and Written Opinion as mailed on Jan. 27, 2009 for International Application No. PCT/GB2008/051003.

* cited by examiner

Primary Examiner — Robert A Hopkins
(74) Attorney, Agent, or Firm — Quarles & Brady LLP

(57) ABSTRACT

A fluid treatment device is disclosed. The device includes a vessel having a fluid entrance and exit. Within the vessel hollow fiber of nano-porous material are arranged so as to define two volumes separated by the nano-porous material. In one embodiment the fluid, air, passes up the center of the hollow fiber drying as the air contacts the inner walls of the fiber. The device is purged by stopping the flow through the device and allowing the air pressure that builds up between the fibers to be released through the nano-porous material.

14 Claims, 11 Drawing Sheets

FLUID TREATMENT DEVICE

CROSS-REFERENCE TO RELATED APPLICATIONS

The present application claims the benefit of British Patent Application No. GB 0721107.1 filed Oct. 27, 2007, and the benefit of PCT International Application No. PCT/GB2008/051003 filed Oct. 27, 2008, both of which are incorporated herein by reference for all purposes.

The present invention relates to a device for use in the treatment of fluid, and relates particularly but not exclusively, to a device used in the treatment of compressed air.

FIG. 1 illustrates an apparatus currently used in industry to treat compressed air. It illustrates the use of two cylindrical columns 102, 104 within which are contained a bed of desiccant adsorbent beads. Such an adsorbent bead containing column is used to treat air by pumping impure air into one end and out of the other. As air passes through such a column under pressure it comes into contact with the adsorbent beads and molecules constituting impurities in the air for example but not limited to water, adhere to their surfaces. This provides the result that the air pumped out of the column contains a reduced impurity fraction relative to air pumped in.

The adsorbent beads become saturated with impurity molecules after a certain amount of air has passed over them in that they are no longer able to adsorb impurity molecules. In order to continue to effectively treat air, the adsorbent properties of the beads need to be regenerated by removing previously adsorbed impurity molecules. This is achieved by pumping treated air at near atmospheric pressure back through a column containing beads to be regenerated. The treated air removes impurity molecules from the surfaces of such beads.

The apparatus illustrated in FIG. 1 allows regeneration by utilising two columns containing desiccant adsorbent beads 102, 104. When the beads of one column 104 become saturated, a fraction of the treated air pumped out of the unsaturated column 102 is depressurised and expands through control orifice 106 into and through the saturated column in order to remove impurity molecules from the saturated beads. When the beads in column 102 themselves eventually become saturated, the reverse situation occurs in that air is pumped into column 104 for treatment and treated air is directed through the control orifice into and back through column 102 wherein such air is removed from the apparatus.

The apparatus illustrated in FIG. 1 operates according to the cycle shown in FIG. 2. Column 102 initially operates in a drying stage by pumping air through column 102. Column 104 is initially depressurised before a fraction of the treated air from column 102 is directed through control orifice 106 into column 104 as a purge flow. This dry air at a lower pressure is readily able to extract water from the desiccant beads. After purging, column 104 is re-pressurised before the cycle repeats itself but for the opposite column in that column 104 operates in a drying stage and column 102 is purged.

A problem with the apparatus illustrated in FIG. 1 is that the pressure of treated air extracted from the apparatus is less than the pressure of air pumped into the apparatus. Therefore air being pumped into the apparatus must be at a higher pressure than is required for the air which is to be extracted. Another problem with the apparatus illustrated in FIG. 1 is that the amount of treated air extracted is less than the amount of air input into the apparatus resulting in a significant amount of air being effectively wasted which is expensive. For example, the use of the purge air (typically 18-25% of the total output is used in purging) is very expensive and reduces the output air flow to 75-82% of inlet air, representing a significant loss of capacity and efficiency.

Furthermore, existing 'packed bed' desiccant devices also suffer from settlement of the beads and attrition which includes the blocking of downstream valves due to dust being produced by breakdown of the beads as they rub against each other. Channelling where gaps open up in the bed and by-pass where settling of the beads means that they must be operated vertically which limits their flexibility in use. Hot spots and deterioration of adsorption performance due to poor heat loss from the bed lead to poor drying performance and higher than necessary energy consumption.

Preferred embodiments of the present invention seek to overcome the above disadvantages of the prior art.

According to the present invention there is provided, a fluid treatment device comprising:—
a vessel having access means for allowing a fluid to enter and leave the vessel; and
at least one element having at least one aperture extending at least partially into the element wherein the element is formed from at least one porous material adapted to adsorb at least one impurity from said fluid.

By providing an element having at least one aperture extending at least partially into the element allows an increased surface area of adsorbent material to contact fluid as it flows through the device providing the advantage of treating air faster and more effectively than when simply pumping air through a column containing a plurality of desiccant adsorbent beads. This also decreases the drop in compressed air pressure across the vessel. Furthermore, the use of hollow fibres decreases problems such as settling of beads that leads to the rubbing of beads against each other causing them to break down. Thus problems of damage to downstream apparatus such as valves are reduced. This also allows the device to be used in any orientation and not just vertically as seen in bead columns of the prior art.

In a preferred embodiment the fluid treatment device further comprises sealing means wherein the sealing means and the or each element define a plurality of volumes within the vessel.

By providing more than one volume inside the vessel provides that advantage of allowing air to be forced from one volume into another through the pores of the porous material forming the element (typically a hollow fibre) when there is a pressure differential between any two volumes. This allows purging of the device without the need to pump in treated air from an external source in that air which has passed through the hollow fibres may be used to purge the porous material comprising that same element if it is made to pass back through it when the pressure in one of the volumes is reduced. As a result the volume of purge air used is significantly reduced and can in some circumstances be completely eliminated.

In another preferred embodiment the sealing means and the or each element define at least one volume which is only in communication with the access means through pores in the porous material.

By having one volume that is not in communication with the access means, the advantage is provided that where a hollow fibre is used all of the air that is being treated can be directed up the centre of the column. This has the advantage that it is generally the case that the pores at the centre of the fibre are larger making it easier for the impurities to be adsorbed. This also has the advantage that the vast majority of the adsorption of impurities takes place towards the inner surface of the fibre. Therefore when purge air passes through the fibre (from the second volume that is not in communication with the access means, that is from the outer surface of the hollow fibre to the inner surface) the process of desorption only needs to take place over a short distance adjacent the inner surface.

In a further preferred embodiment the aperture in the element extends through the element.

In a preferred embodiment the aperture in the element does not extend through the element.

By providing an element comprising an aperture that does not extent through its entire length, all air must pass through the pores of the porous material comprising that element which can be made to act as a filter in addition to a drying means. This provides the advantage that air which passes through the porous material of such an element is both free from particulate and molecular impurities.

In another preferred embodiment the fluid treatment device further comprises at least one heating element engaged with at least one element.

By providing a heating element in engagement with an element this provides the advantage that air is heated as it passes through the porous material of that element increasing the ability of such air to carry the water and provides rapid evaporation of water making it easier for water molecules to be removed from the porous material during the purging step. As a result the porous material is more effectively regenerated.

In a further preferred embodiment the device further comprises at least one filter placed within the vessel.

By providing at least one filter in the vessel of the air treatment device, this provides the advantage that the air which passes through the filter is both free from particulate and molecular impurities.

In a preferred embodiment the treatment device comprises at least one fluid input portion and at least one fluid output portion.

In another preferred embodiment the porous material is a nano porous material.

According to another aspect of the present invention there is provided a method of removing impurities from a fluid comprising the steps of:

pumping at least one fluid into an inlet of a vessel and out of at least one outlet of said vessel, the vessel having at least one first and at least one second volume separated by at least one element formed of porous material adapted to adsorb at least one impurity from said fluid, wherein pumping fluid through said vessel increases the pressure of the fluid in the or each first and second volume;

closing a valve adjacent said outlet thereby preventing said fluid flowing out of said outlet; and exposing said inlet to lower pressure thereby allowing fluid in said first and second volumes to pass through said inlet.

In a preferred method said fluid in said vessel is only able to transfer between said first and second volumes by flowing through the pores in said element.

In another preferred method said fluid is pumped into at least one aperture extending at least partially into said element.

In a further preferred method said element is heated.

In a preferred method said fluid is pumped through at least one filter placed within said vessel.

In another preferred method said porous material is a nano-porous material.

Preferred embodiments of the invention will now be described, by way of example only and not in any (imitative sense, with reference to the accompanying drawings in which:—

Figure 3:
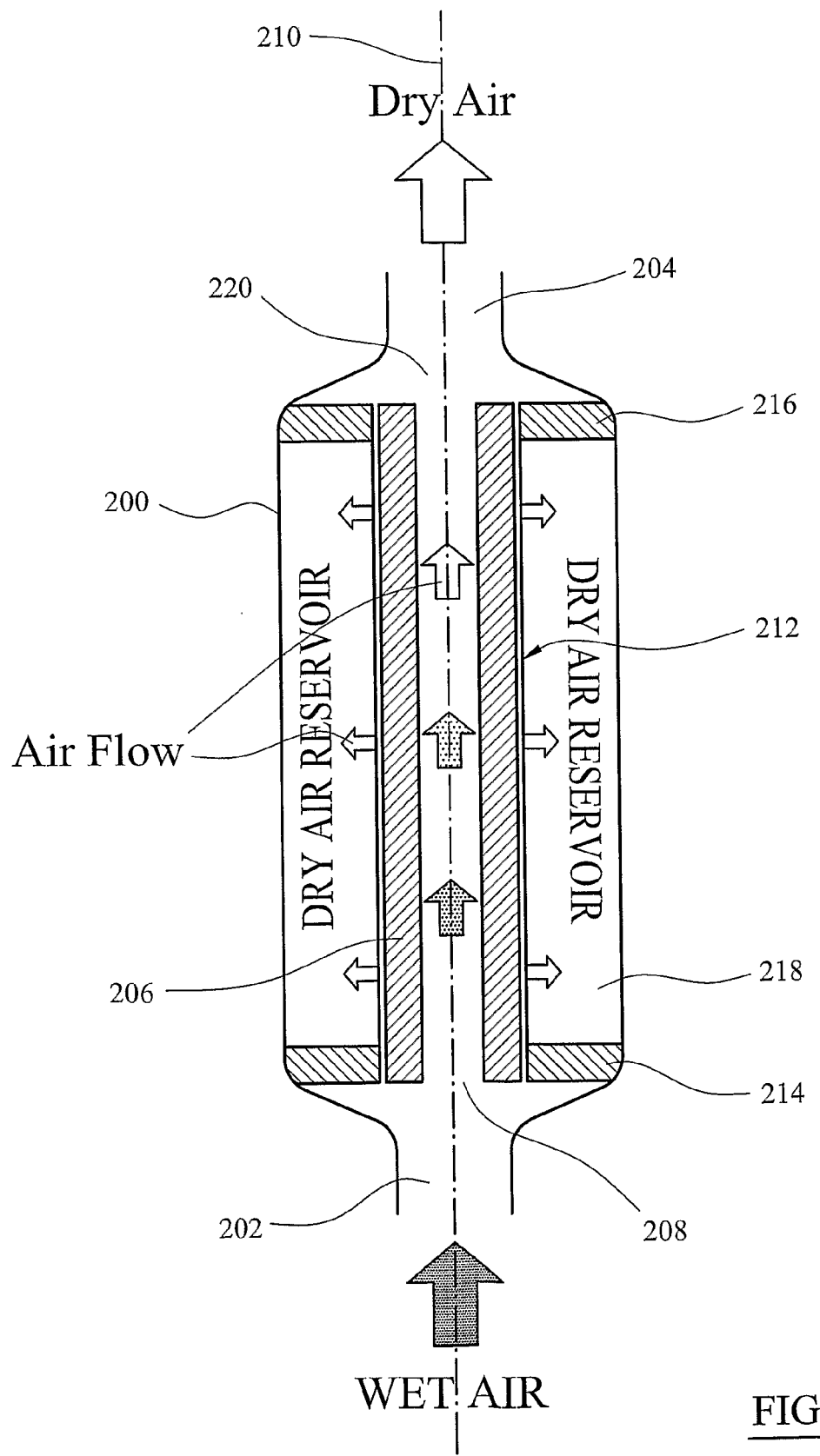
FIG. 3 is a cross sectional schematic representation of the treatment step of a first embodiment of the present inventions in a treatment portion of a cycle.

With reference to FIG. 3, an air treatment device has a substantially cylindrical vessel 200 with access means to an internal volume of the vessel provided in the form of first and second apertures 202 and 204 respectively at either end of the vessel to allow a stream of fluid, typically air to enter and leave the vessel. Housed within the vessel is a column of nano porous material 206 with an aperture 208 extending the length of the column along axis 210. An example of a nano porous material used in the air treatment device is disclosed in PCT/GB2006/002509, the disclosure in which is incorporated by reference. Engaged with the outer surface of the hollow column of porous material is a heating element 212 for providing heat to the material constituting the column of porous material. The heating elements are provided are a layer around the outside of the hollow fibre, although the layer could be located on the inner surface of the fibre. The heating element is made from a mixture of copper and carbon and is formed during the production of the fibre. Further details of the heating element can be found in UK Patent Application No 0704934.9, although other heating elements are equally applicable.

Potting resin provides seals 214 and 216 which are adapted to engage the inner wall of the vessel and heating element or the outer wall of the hollow column of porous material so as to define two volumes. A first defined volume 218 is only in communication with the apertures 202 and 204 of the vessel through the pores in porous material 206. In contrast a second defined volume 220 is freely in communication with the aperture 202 and 204 since it constitutes the space within the aperture of the hollow column of porous material which communicates with both apertures of the vessel. Air is able to pass through the porous material forming the hollow column and may thus transfer between the two volumes.

The operation of the air treatment device shown in FIG. 3 will now be described. The first aperture 202 of vessel 200 is connected to a source of wet air requiring drying and the second aperture 204 of the vessel is connected to an auxiliary component into which dry air flows as it is removed from the vessel. Potting resin, constituting seals 214 and 216, is a non porous material, thus air is unable to pass through it and molecules constituting impurities e.g. water, in the air pumped into the vessel are unable to become adsorbed by it. Wet air is pumped into the first aperture and directed by seal 214 into aperture 208 of the column of porous material 206.

Air propagates within aperture 208 by flowing in turbulent vortices which themselves have a net motion along the aperture. The circular flow of air within such a turbulent vortex ensures that a significant fraction of the wet air initially pumped into the vessel comes into contact with the inner surface of the hollow column of porous material as the vortices propagate along the aperture.

When wet air comes into contact with the nano porous material on the internal surface of the hollow column, water molecules in the air become adsorbed by the porous material and are removed from the flow of air. The further that air propagates through aperture 208 along axis 210 the more time wet air has to contact the surface of nano porous material. This ensures that the further that air travels along the aperture the smaller the number of water molecules there is in such air. Air is pumped through the aperture in the hollow column of porous material and out of the second aperture 204 in the vessel. Air pumped out of the vessel into the auxiliary component contains significantly less water molecules than air initially pumped in.

It is to be noted that, before air is pumped into the vessel, both the first volume 218 and second volume 220 are at the same pressure. However, as air is pumped into the vessel, the pressure of air in the second volume initially increases at a higher rate than the pressure of air in the first volume, thus creating a pressure differential between the two volumes. In order to equalise the pressure between the two volumes air is made to pass through the porous material of the hollow column from the second defined volume to the first. As air passes through the porous material a significant fraction of the water molecules in such air are adsorbed such that the air passing into the first volume effectively constitutes a reservoir of dry air.

Figure 4:
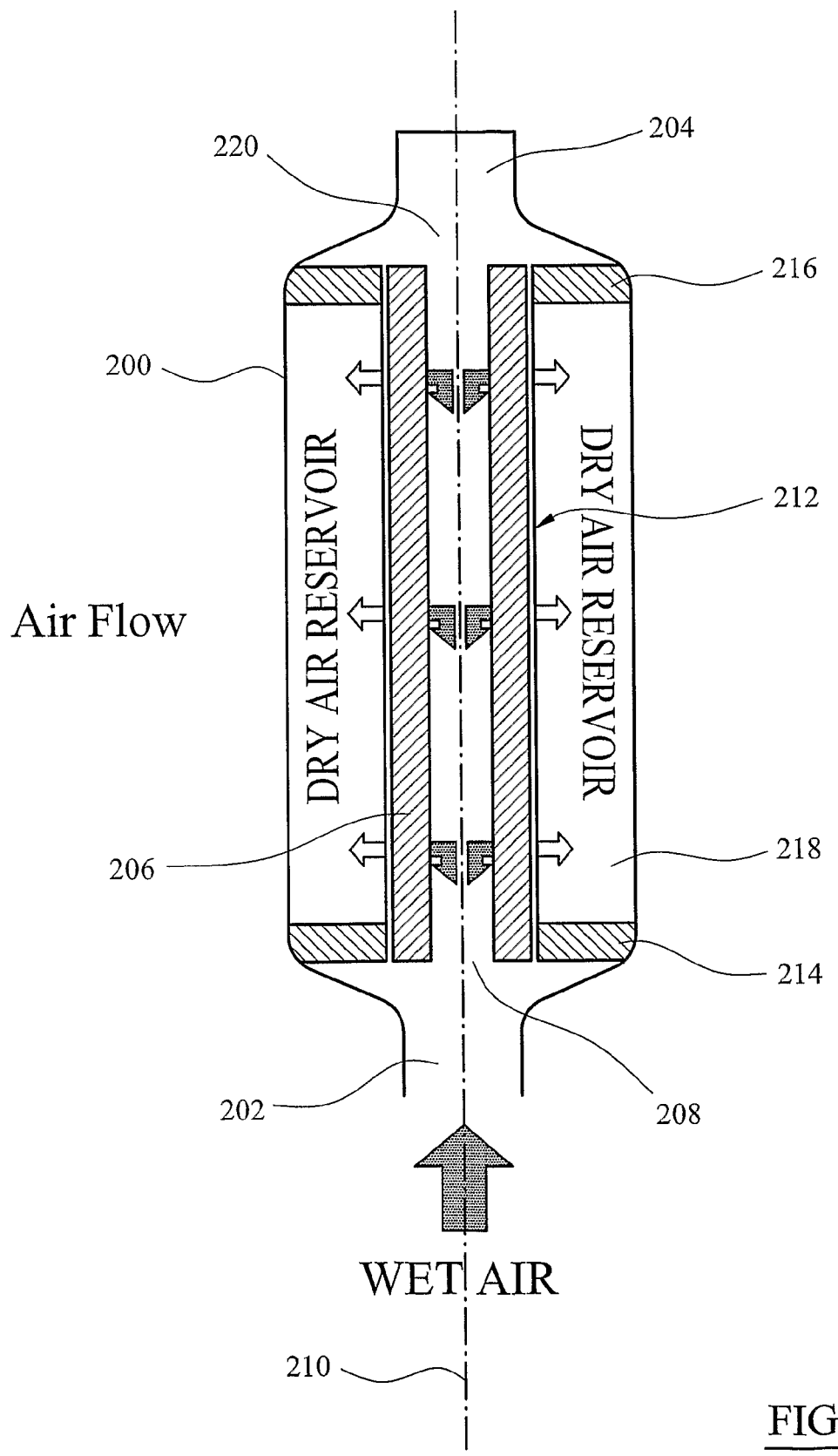
FIG. 4 is a cross sectional schematic representation of the device of FIG. 3 in a purging portion of a cycle.

At a point in time before the porous material becomes saturated with water molecules and is unable to remove a desired amount of water molecules from wet air pumped into the vessel, the porous material needs to be regenerated by purging as illustrated in FIG. 4. Purging is carried out by sealing both of the apertures of the vessel and subsequently stopping the pumping of air into the first aperture which, whilst remaining sealed, may be connected to a second auxiliary component provided that the pressure within the auxiliary component is less than the pressure of air within the sealed vessel. Alternatively the first aperture 202 may be exposed to the atmosphere.

When both apertures of the vessel remain sealed the pressure is equal in both of the defined volumes within the vessel. If the first aperture is then opened, air exits out of the second volume through the first aperture and into a region of lower air pressure thus reducing the air pressure in the second volume. This again produces a pressure differential between the first and second volumes. To equalise the air pressure between the two volumes, dry air is forced from within the first volume through the porous material of the hollow column into the second volume. As dry air passes through the porous material, water molecules that had previously been adsorbed by the porous material are removed from the porous material so as to once again constitute an impurity fraction in the air flow. This water molecule containing air is further forced from the vessel and into the region of lower air pressure. A small volume of dry air, from another source, may be blown down the aperture 208 to assist this purging process. Heating element 212 may be used to heat the porous material constituting the hollow fibre. This heats the air as it passes through the porous material increasing its ability to carry the water and provides rapid evaporation of water making it easier for water molecules to be removed from the porous material during the purging step. As a result the porous material is more effectively regenerated.

The vessel may once again be connected to a source of wet air to be dried and is re-pressurised before the above process repeated in that the adsorbent properties of the porous material are regenerated by the self purging step.

Figure 2:
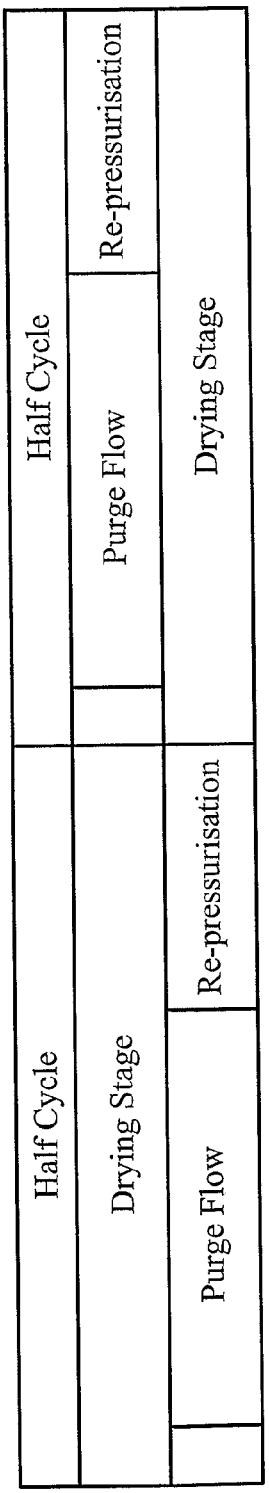
FIG. 2 is an operational cycle of the apparatus in FIG. 1.
Figure 5:
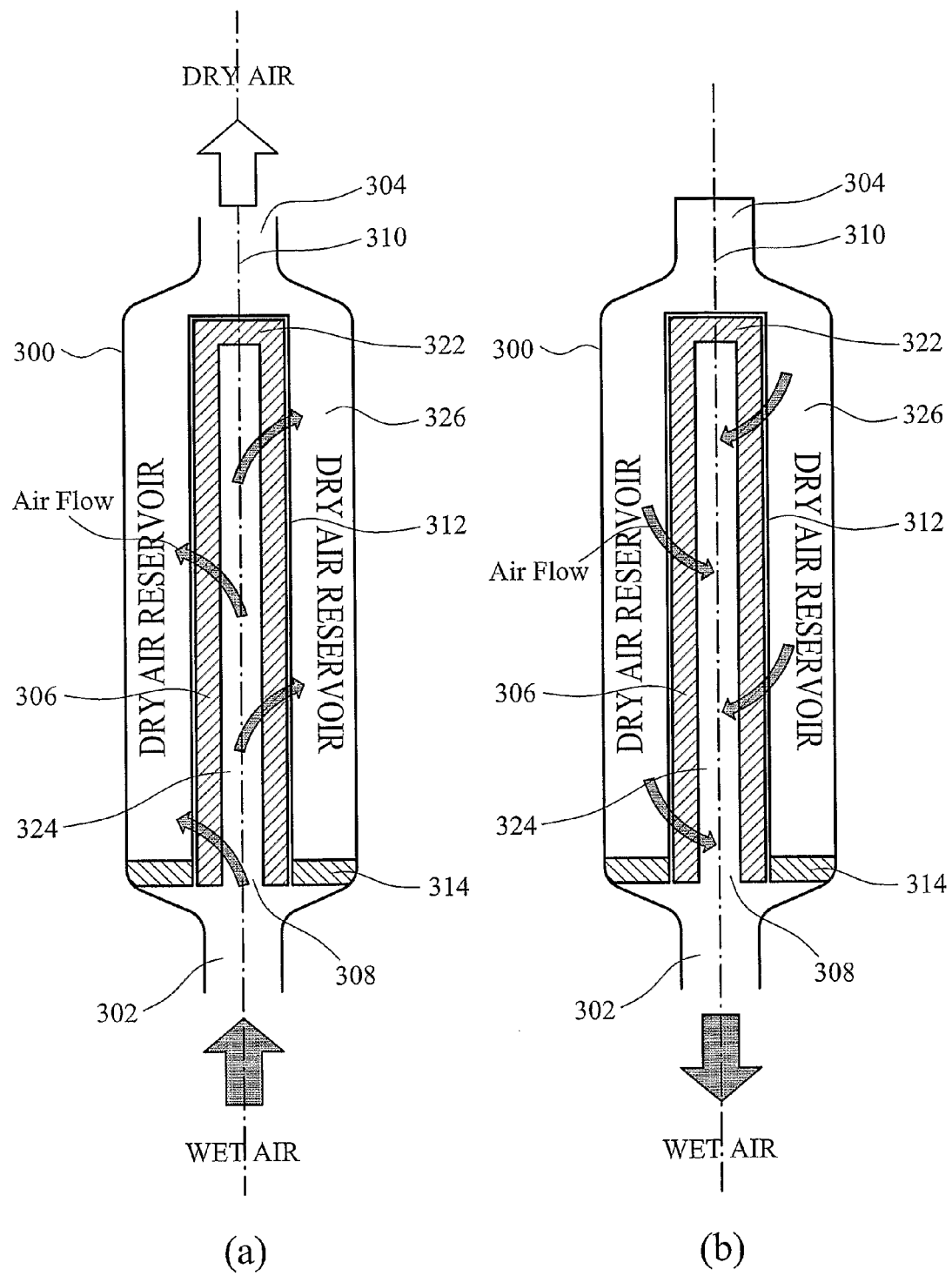
FIG. 5 is a cross sectional schematic representation of a second embodiment of the present invention.

A second embodiment of the invention is illustrated in FIGS. 5a and 5b in which parts common with FIGS. 2 and 3 are denoted with like reference numerals increased by 100. This second embodiment differs from the first embodiment in that aperture 308 in the column of porous material 306 has an end portion 322 such that the aperture does not extend all the way through the column of porous material along axis 310. In this second embodiment this end portion 322 is adjacent the second aperture 304 in the vessel such that wet air is able to be pumped directly into the aperture 308 of the hollow column of porous material 306. Potting resin constitutes seal 314 which is adapted to engage the inner surface of vessel 300 and the heating element 312 or outer surface of the column of porous material so as to define two volumes. A first volume 324 communicates with the first aperture 302 in the vessel and a second volume 326 communicates with the second aperture 304 in the vessel. The two volumes are only in communication with each other through pores in the porous material forming the hollow column wherein air is able to pass through the porous material and transfer between the two volumes. However, molecules constituting impurities in such air e.g. water, will be adsorbed onto the porous material.

The operation of the air treatment device illustrated in FIGS. 5a and 5b will now be described. In particular the second embodiment operates a drying step illustrated in FIG. 5a wherein the first aperture 302 of vessel 300 is connected to a source of wet air requiring drying and the second aperture 304 of the vessel is connected to an auxiliary component into which dry air flows as it is removed from the vessel. Potting resin constituting seal 314 is a non porous material and thus air is unable to pass through it and molecules constituting impurities e.g. water, in the air pumped into the vessel are unable to become adsorbed by it.

Wet air is pumped into the first aperture of the vessel and is directed by the seal into aperture 308 of the hollow column of porous material 306. As air is pumped into the vessel the air pressure in the first volume 324 initially becomes greater than the air pressure in the second volume 326 such that there exists a pressure differential between the two defined volumes on either side of the porous material constituting the hollow column. In order to equalise the pressure between the two defined volumes air passes through the porous material from the first volume and into the second. As wet air comes into contact with the porous material water molecules become adsorbed by the porous material and are thus removed from the air flow such that the air transferred to the second volume contains a significantly reduced number of water molecules. Such dry air is then pumped out of the vessel through the second aperture 304 to an auxiliary component.

Once the porous material becomes nearly saturated with impurity molecules and is unable to sufficiently dry wet air pumped into the vessel, the porous material needs to be regenerated by a purging step as illustrated in FIG. 5b. Both of the apertures of the vessel are sealed and wet air is stopped from being pumped into the first aperture which, whilst remaining sealed may be connected to a second auxiliary component provided that the pressure within the auxiliary component is less that the pressure of air within the sealed vessel. Alternatively the first aperture may be exposed to the atmosphere.

The dry air residing in the second volume within the sealed vessel constitutes a dry air reservoir which is used to purge the porous material. With both apertures of the vessel sealed the air pressure in both defined volumes within the vessel on either side of the porous material is equal. However when the first aperture of the vessel is opened, the air in the first volume is forced through the first aperture and out of the vessel into a region of lower pressure. This once again produces a pressure differential between the two defined volumes within the vessel wherein the dry air in the second volume is now at a higher pressure than air in the first. This ensures that air in the second volume passes back through the porous material constituting the hollow column wherein doing so water molecules that had previously been adsorbed by the porous material are removed from such porous material so as to once again constitute an impurity fraction in the air flow. The water molecule containing air is further forced from the vessel and into the region of lower pressure. Heating element 312 heats the air as it passes through the porous material increasing its ability to carry water and provides rapid evaporation of water making it easier for water molecules to be removed from the porous material during the purging step. As a result the porous material is more effectively regenerated.

The vessel may once again be connected to a source of wet air to be dried and is re-pressurised before the above process repeated in that the adsorbent properties of the porous material are regenerated by the self purging step.

Figure 6:
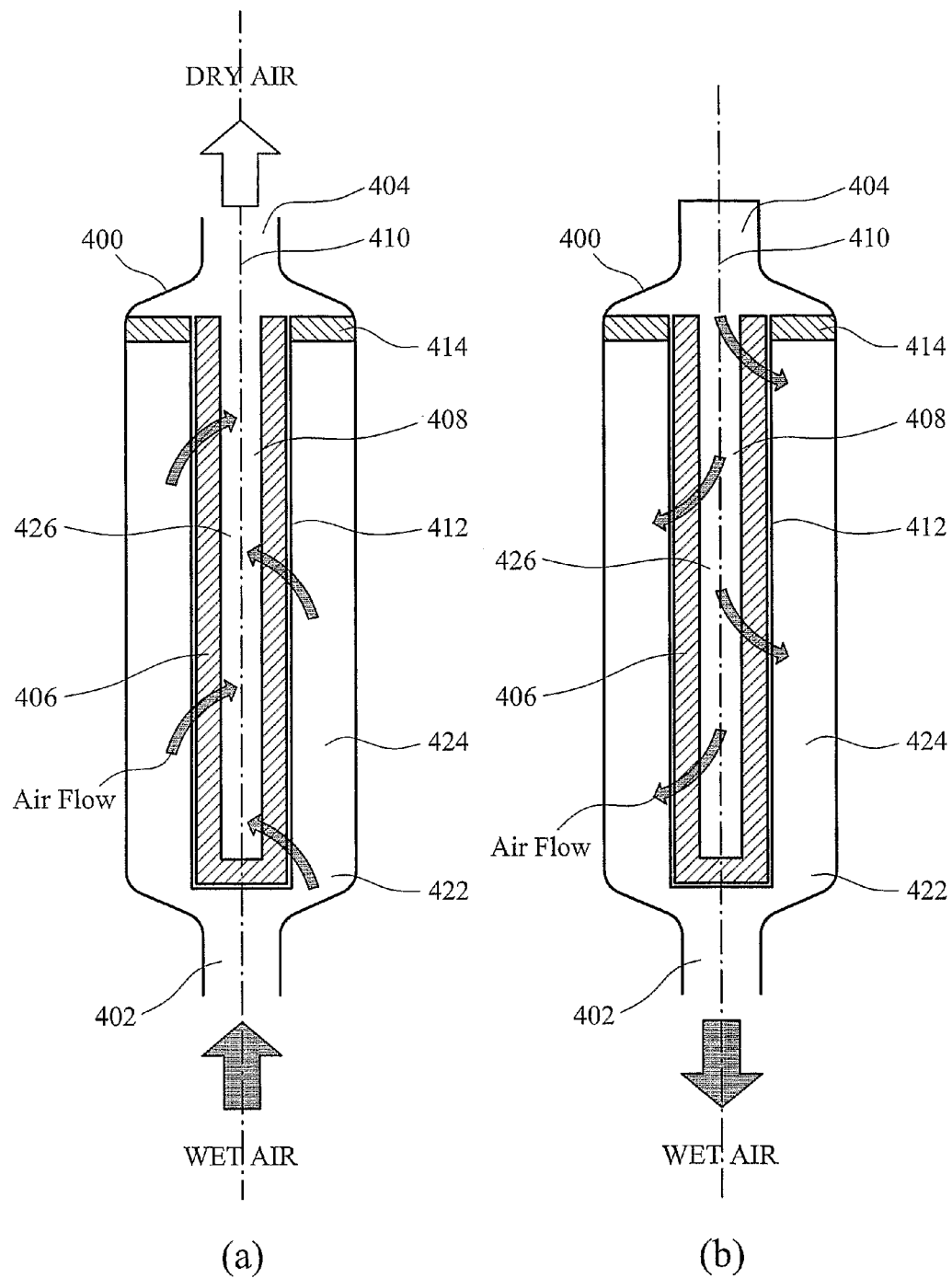
FIG. 6 is a cross sectional schematic representation of a third embodiment of the present invention.

A third embodiment of the invention is illustrated in FIGS. 6a and 6b in which parts common with FIGS. 5a and 5b are denoted with like reference numerals increased by 100. This third embodiment differs from the second embodiment of the device in that aperture 408 in the column of porous material 406 has an end portion 422 such that the aperture does not extend all the way through the column of porous material along axis 410. In this third embodiment, end portion 422 is adjacent the first aperture 402 in the vessel such that wet air is not able to be pumped directly into the aperture of the hollow column of porous material. Potting resin constitutes seal 414 which is adapted to engage the inner surface of vessel 400 and the heating element 412 or outer surface of the column of porous material so as to define two volumes. A first volume 424 communicates with the first aperture 402 in the vessel and a second volume 426 communicates with the second aperture 404 in the vessel. The two volumes are only in communication with each other through pores in the porous material forming the hollow column wherein air is able to pass through the porous material and transfer between the two volumes, however molecules constituting impurities in such air e.g. water, cannot.

The operation of the air treatment device illustrated in FIGS. 6a and 6b will now be described. In particular the third embodiment operates a drying step illustrated in FIG. 6a wherein the first aperture 402 of vessel 400 is connected to a source of wet air requiring drying and the second aperture 404 of the vessel is connected to an auxiliary component into which dry air flows as it is removed from the vessel. Potting resin, constituting seal 414 is a non porous material and thus air is unable to pass through it and molecules containing impurities e.g. water, in the air pumped into the vessel are unable to become adsorbed by it.

Wet air is pumped into the first aperture of the vessel and due to the presence of seal 414 the air pressure in the first volume 424 initially becomes greater than the air pressure in the second volume 426 such that there exists a pressure differential between the two defined volumes on either side of the porous material forming the hollow column. In order to equalise the pressure between the two defined volumes air passes through the porous material from the first volume and into the second. As wet air comes into contact with the porous material water molecules become adsorbed by the porous material and are thus removed from the air flow such that the air transferred to the second volume contains a significantly reduced number of water molecules. Such dry air is then pumped out of the vessel through the second aperture 404 to an auxiliary component.

Once the porous material becomes nearly saturated with impurity molecules and is unable to sufficiently dry wet air pumped into the vessel, the porous material needs to be regenerated by a purging step as illustrated in FIG. 6b. Both of the apertures of the vessel are sealed and wet air is stopped from being pumped into the first aperture which, whilst remaining sealed may be connected to a second auxiliary component provided that the pressure within the auxiliary component is less that the pressure of air within the sealed vessel. Alternatively the first aperture may be exposed to the atmosphere.

The dry air residing in the second volume within the sealed vessel constitutes a dry air reservoir which is used to purge the porous material. With both apertures of the vessel sealed the air pressure in both defined volumes within the vessel on either side of the porous material is equal. However when the first aperture of the vessel is opened, the air in the first volume is forced through the first aperture and out of the vessel into a region of lower pressure. This once again produces a pressure differential between the two defined volumes within the vessel wherein the dry air in the second volume is now at a higher pressure than air in the first. This ensures that air in the second volume passes back through the porous material forming the hollow column wherein doing so water molecules that had previously been adsorbed by the porous material are removed from such porous material so as to once again constitute an impurity fraction in the air flow. Such water molecule containing air is further forced from the vessel and into the region of lower pressure. Heating element 412 may be used to heat the porous material forming the hollow fibre. This heats the air as it passes through the porous material increasing its ability to carry water and provides rapid evaporation of water making it easier for water molecules to be removed from the porous material during the purging step. As a result the porous material is more effectively regenerated.

The vessel may once again be connected to a source of wet air to be dried and is re-pressurised and the above process repeated in that the adsorbent properties of the porous material are regenerated by the self purging step.

Figure 7:
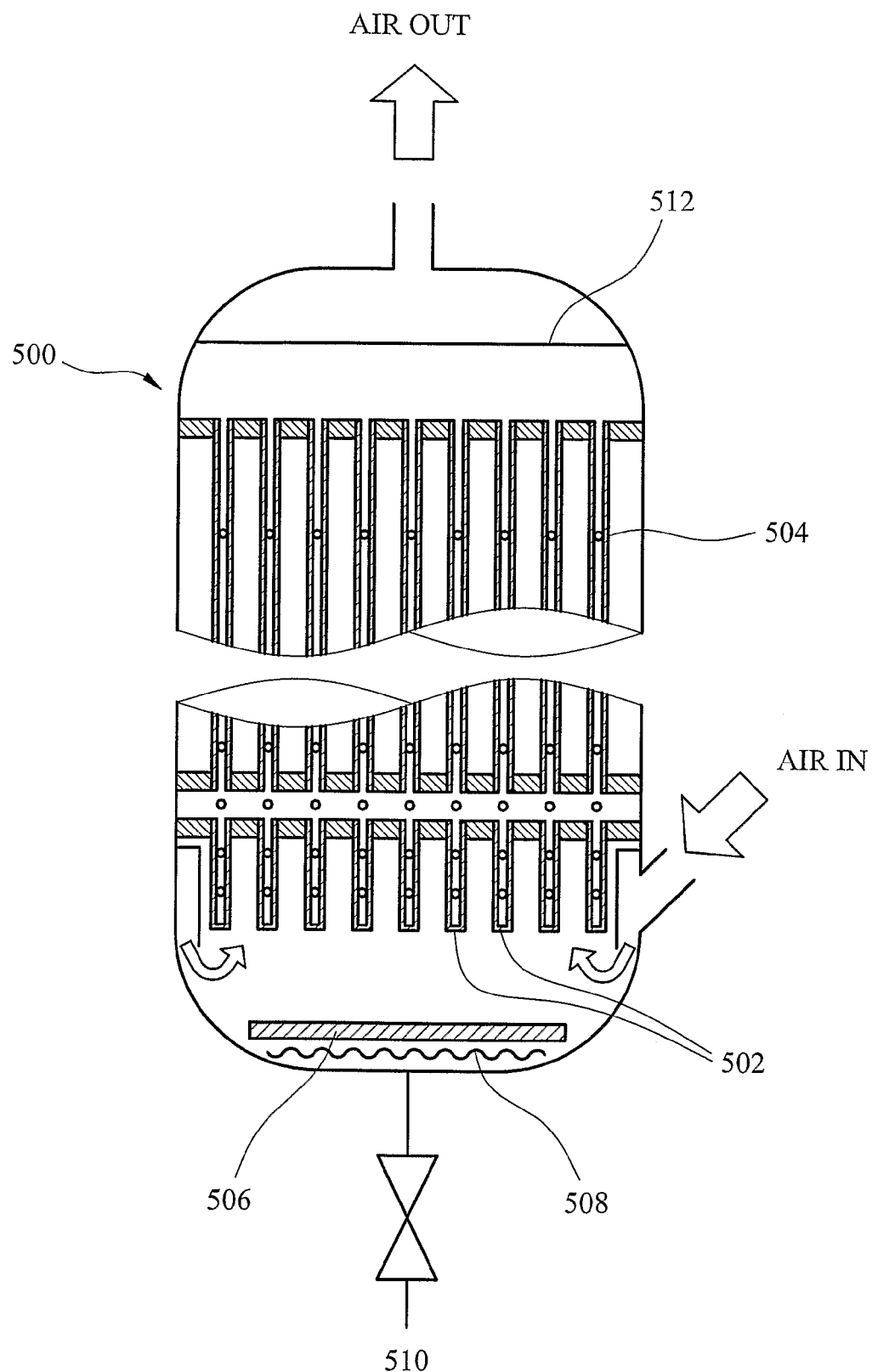
FIG. 7 is a cross sectional schematic representation of an air treatment device of another embodiment of the present invention.
Figure 8:
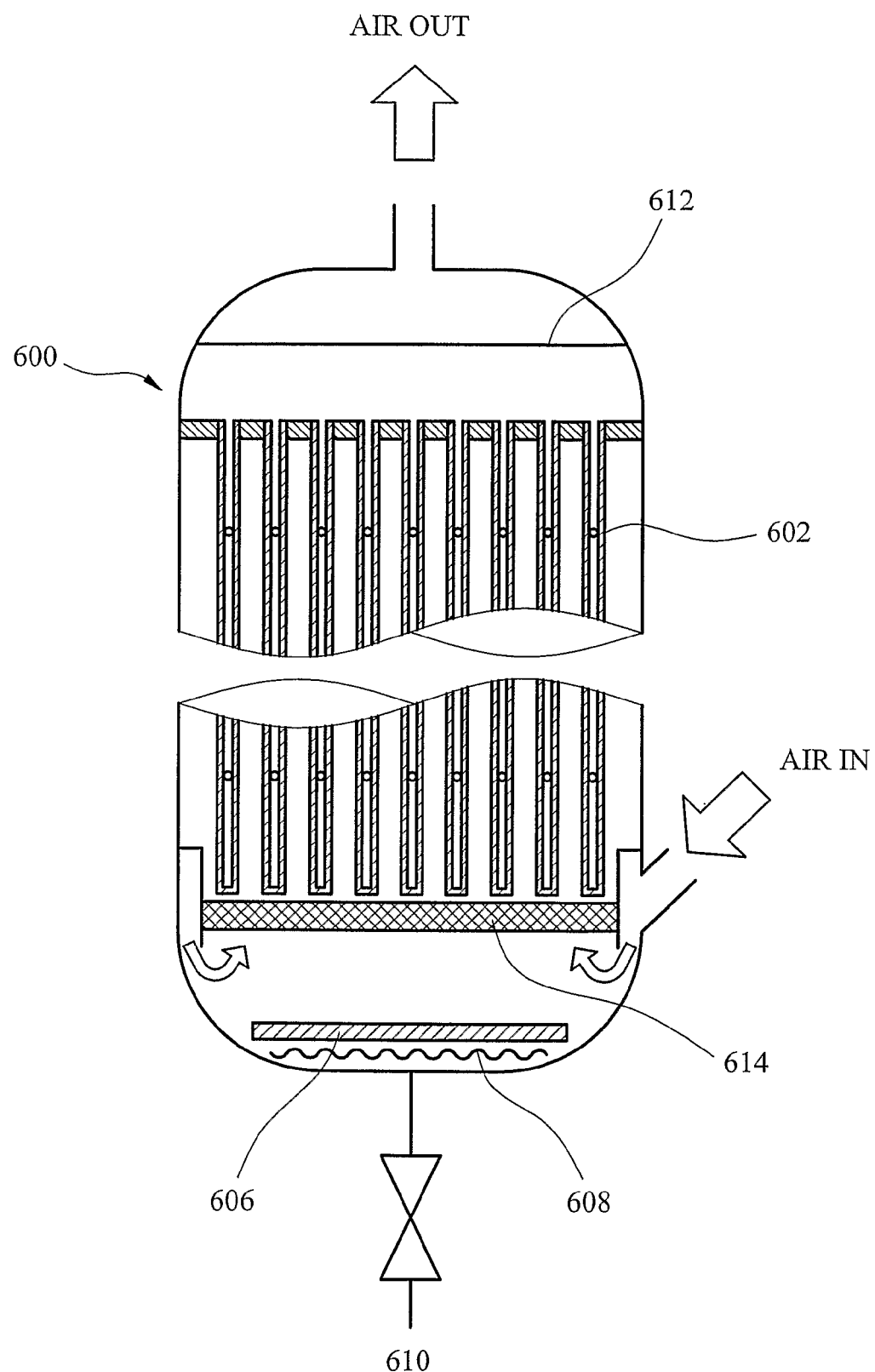
FIG. 8 is a cross sectional view of an air treatment device of a further embodiment of the present invention.

The embodiments of the invention discussed above have been described through the use of a single hollow fibre. It must be noted that when any of the embodiments of the invention are used in practice, more than one hollow fibre may be utilised as illustrated in FIGS. 7 and 8. FIG. 7 illustrates an air treatment device utilising two bundles of porous fibre, each comprising more than one hollow column. One such bundle 504 is in accordance with the first embodiment of the invention and the other such bundle 502 is in accordance with the third embodiment of the invention. FIG. 8 illustrates an air treatment device utilising a hollow fibre bundle containing more than one hollow column according to the third embodiment of the invention.

Other impurities in air may consist of oils or particulate solids. A further aspect of the present invention is a regenerative filter to remove such impurities from air. FIG. 7 illustrates an air treatment device 500 comprising two bundles of hollow fibre. A first hollow fibre bundle 502 is in accordance with the third embodiment of the invention and a second hollow fibre bundle 504 is in accordance with the first embodiment. The air treatment device may further comprise baffle plate 506 to separate impurities previously removed from air 508 from the first fibre bundle wherein such impurities are removed from the apparatus through drain 510. A filter membrane 512 may also be incorporated into the device such that after flowing through both of the hollow fibre bundles, air must flow through a filter before exiting the device. The hollow fibres comprising the first bundle may or may not be of a similar composition to the hollow fibres comprising the second bundle.

Air treatment device 500 in FIG. 7 operates in much a similar way to the embodiments previously discussed. The first hollow fibre bundle 502 acts as a regenerative filter in that this fibre bundle mostly removes oils and solids from air flowing through the device. The second hollow fibre bundle 504 acts to dry air and acts to remove water molecules from air flowing through the device. The filter membrane 512 acts as a security measure to prevent any particles from contaminating air that flows out of the device wherein such particles may arise from attrition of the hollow fibre bundles. When the drying stage is complete and the device acts to regenerate the porous material constituting the hollow fibre bundles, wet air will pass back through the first fibre bundle and purge out any solid or oil contaminants which are subsequently removed through drain 510.

The vessel may then once again be connected to a source of air to be treated and the above process repeated in that the adsorbent properties of porous material constituting the hollow fibre bundles are regenerated by the self purging step.

A second device incorporating a regenerative filter is illustrated in FIG. 8 in which parts common with FIG. 7 are denoted with like reference numerals increased by 100. Hollow fibre bundle 614 used in air treatment device 600 has a hydrophobic and oil rejection outer layer which will repel oil and water allowing substantially only air to pass through the fibre walls during the drying stage wherein the entire fibre is regenerated during the self purging regeneration stage. An optional coalescing filter pad 614 is also shown which may in some cases be needed to provide protection to the fibres from excessive liquid loading.

Figure 9:
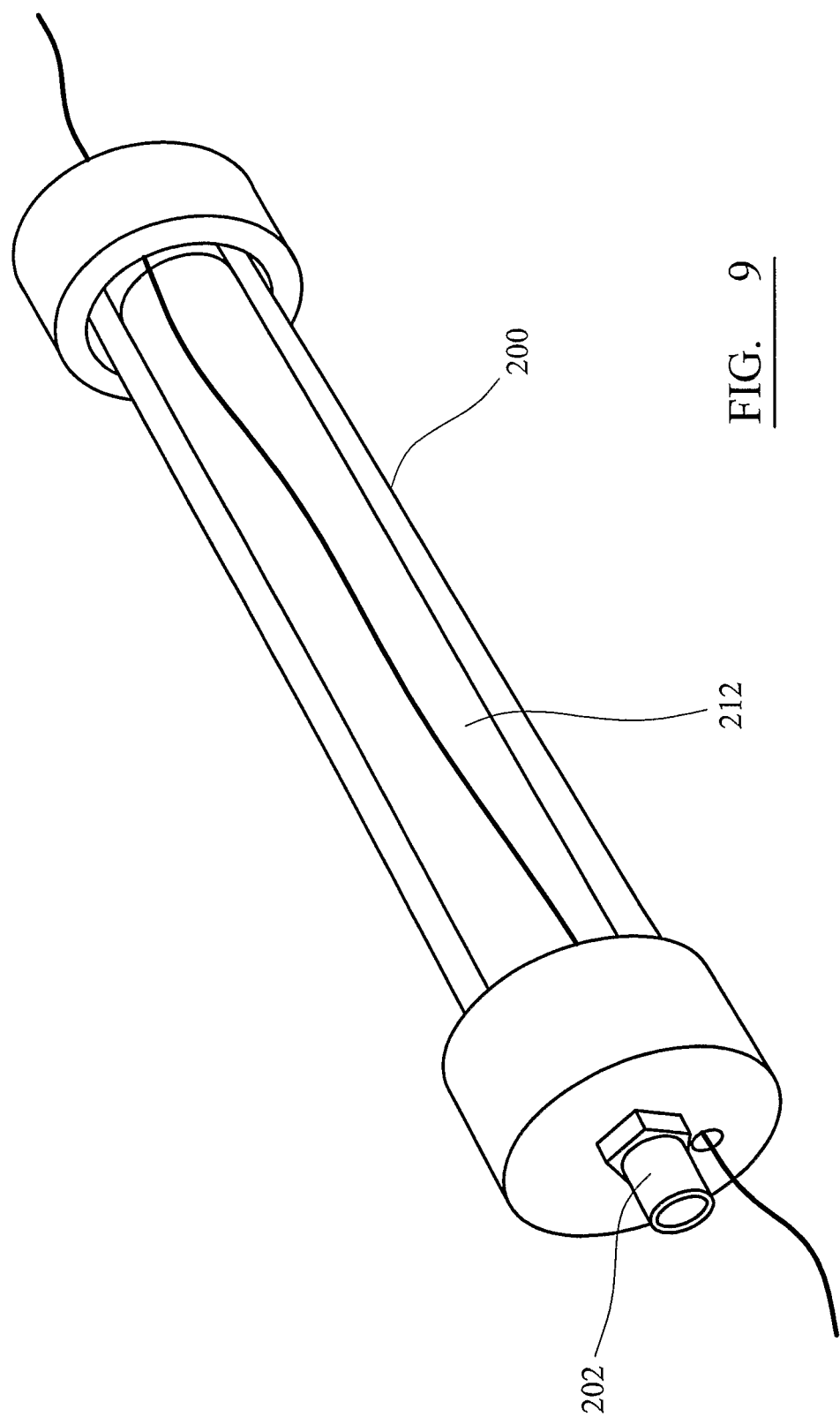
FIG. 9 is a perspective view of an air treatment device of the present invention.

An illustration of an air treatment device according to any of the embodiments previously discussed is illustrated in FIG. 9.

Figure 10:
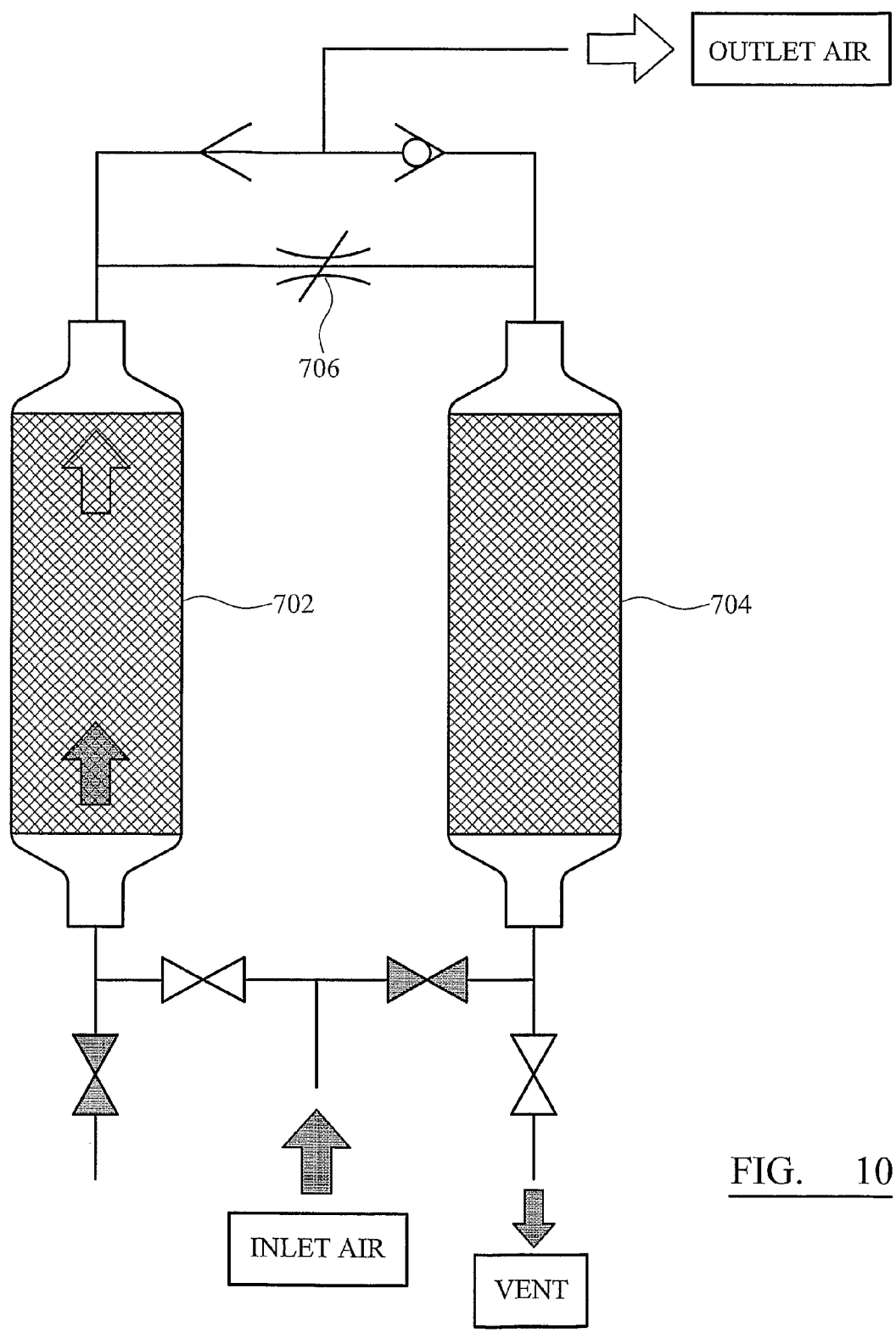
FIG. 10 is a schematic representation of a combination of air treatment devices in a single apparatus.
Figure 11:
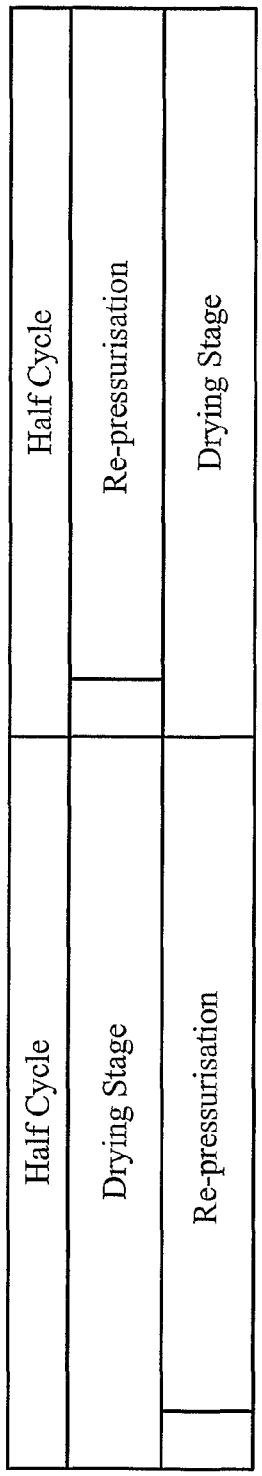
FIG. 11 shows an operational cycle of the apparatus in FIG. 10.

Air treatment devices according to any of the embodiments discussed may be used in any combination with one another wherein an example of such a combination is illustrated in FIG. 10. Columns 702 and 704 comprising the apparatus in FIG. 10 may be in accordance with any of the embodiments previously discussed. The apparatus is operated in accordance with the cycle illustrated in FIG. 11.

Column 702 initially operates in a drying stage in that air is pumped into column 702 from a source of air requiring treatment wherein treated air is then pumped out column 702. Column 704 is initially depressurised wherein such a depressurisation step involves self purging as air is forced out of the column. After depressurisation, column 704 is re-pressurised before the cycle repeats itself but for the opposite column in that column 704 operates in a drying stage and column 702 is depressurised resulting in self purging of column 702.

Figure 1:
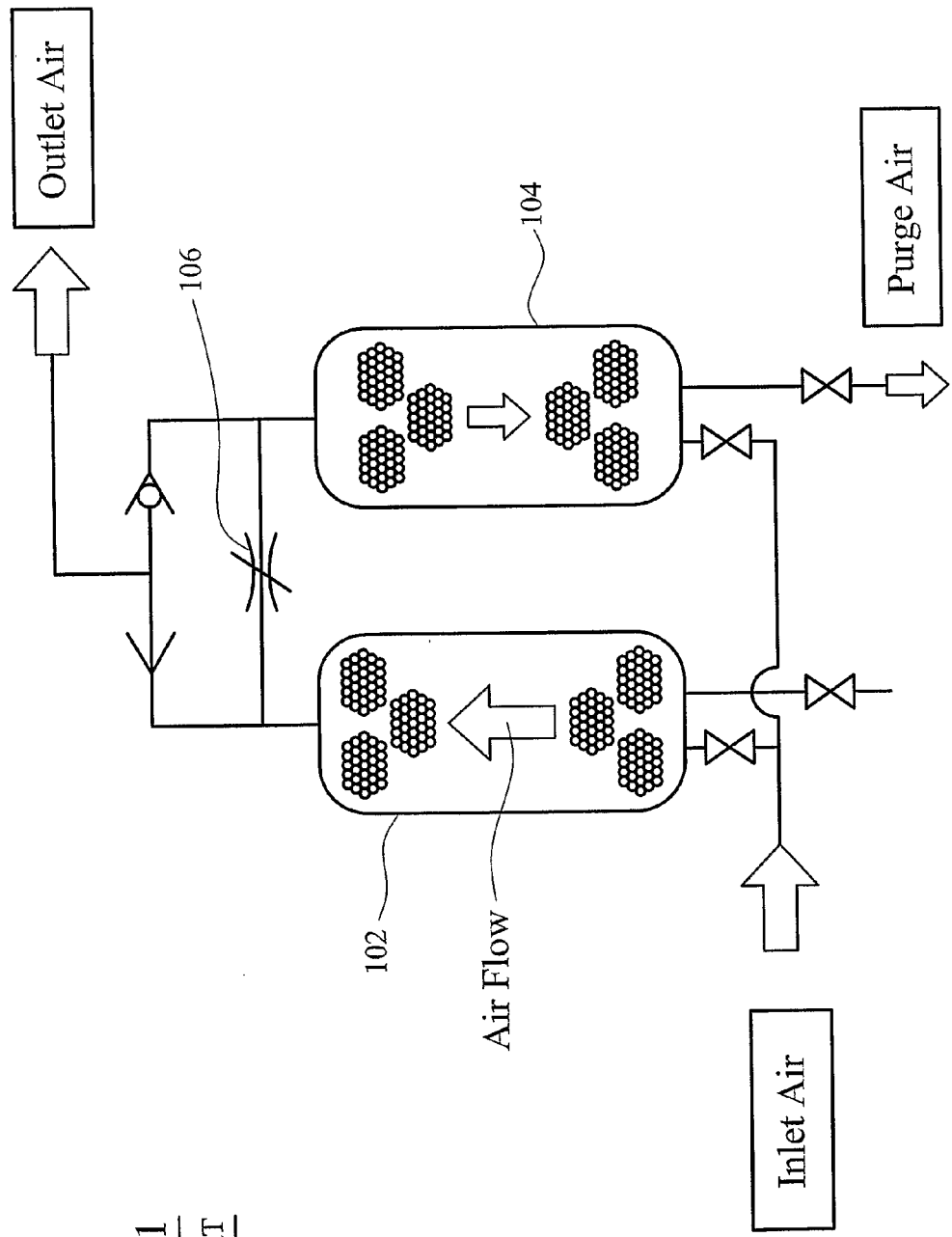
FIG. 1 is a schematic view of the air treatment device in the prior art.

In comparison to the prior art apparatus illustrated in FIG. 1 it is to be noted that it is possible that no treated air flowing from any one the columns is to be directed into the other column in order to purge that column. This provides the advantages of there being very little loss of pressure and very little loss of quantity of air pumped out of the system, relative to air pumped in. However, it may be in some circumstances necessary to use some additional air to help the purging process.

It will be appreciated by persons skilled in the art that the above embodiments have been described by way of example only and not in any limitative sense, and that various alterations and modifications are possible without departure from the scope of the invention as defined by the appended claims. For example, all of the embodiments of the air treatment device disclosed in this application can be adapted and used to remove impurities from other fluids. Furthermore, the heating element could be located on the inside of the aperture 408. This would be of particular use in the embodiment shown in FIG. 6, as it would heat the purging air before it returned into the porous material. The heated air being better able to carry water from the porous material in this purging stage. The above embodiments have been described in connection with the treatment of air. However, these techniques can also be used to treat other fluids, including other gases and can be used for the treatment of liquids. Furthermore it should also be noted that the apparatus can be used without the potting resin sealing the ends of the fibres. Also the apertures in the vessel may be sealed by a valve which may or may not be adjacent the aperture it is required to seal. For instance a valve may seal an aperture in a vessel by engaging the aperture. Alternatively if a pipe is in fluid connection with the aperture, the valve may be in the pipe and not adjacent to or in engagement with the aperture of the vessel it is required to seal. If the valve prevents the flow of fluid from a vessel into a pipe, or any further into a pipe after having flowed a distance into the pipe away from the vessel, this has the same effect as sealing the aperture directly. It can therefore be seen that it is important that there is a small but sufficient volume of dried air within the vessel (and pipework) that can be used to purge the impurities from the material. This volume in the interstitial spaces can also be provided by packing fewer fibres into a bundle. Furthermore, non-hollow fibres may be used in stead of fibres having an aperture therein e.g. a cube or any other shape.

The invention claimed is:

1. A method of removing impurities from a fluid comprising the steps of:
   pumping at least one fluid into an inlet of a vessel and out of at least one outlet of said vessel, the vessel having at least one first and at least one second volume separated by at least one element formed of porous material adapted to adsorb at least one impurity from said fluid, wherein pumping fluid through said vessel increases the pressure of the fluid in the or each first and second volume;
   closing a valve adjacent said outlet thereby preventing said fluid flowing out of said outlet; and
   exposing said inlet to lower pressure thereby allowing fluid in said first and second volumes to pass through said inlet.

2. A method according to claim 1, wherein said fluid in said vessel is only able to transfer between said first and second volumes by flowing through the pores in said element.

3. A method according to claim 1, wherein said fluid is pumped into at least one aperture extending at least partially into said element.

4. A method according to claim 1, wherein said element is heated.

5. A method according to claim 1, wherein said fluid is pumped through at least one filter placed within said vessel.

6. A method according to claim 1, wherein said porous material is a nano-porous material.

7. A fluid treatment device comprising:
   a vessel having at least one access for allowing a fluid to enter and leave said vessel; and at least one element having at least one aperture extending through said element wherein said element is formed from at least one porous material adapted to adsorb at least one impurity from said fluid.

8. The treatment device of claim 7, further comprising at least one seal wherein at least one said seal and the or each said element define a plurality of volumes within said vessel.

9. The treatment device of claim 8, wherein at least one said seal and the or each said element define at least one volume which is only in communication with at least one said access through pores in said porous material.

10. The treatment device of claim 7, wherein said aperture in said element does not extend through said element.

11. A treatment device in accordance with claim 7, further comprising at least one heating element engaged with at least one said element.

12. A treatment device in accordance with claim 7, further comprising at least one filter placed within said vessel.

13. A treatment device in accordance with claim 7, wherein at least one said access comprises at least one fluid input portion and at least one fluid output portion.

14. A treatment device in accordance with claim 7, wherein said porous material is a nano-porous material.

* * * * *